No. 807,010. PATENTED DEC. 12, 1905.
N. F. AMBURSEN.
WASTE GATE FOR DAMS.
APPLICATION FILED JUNE 2, 1905.
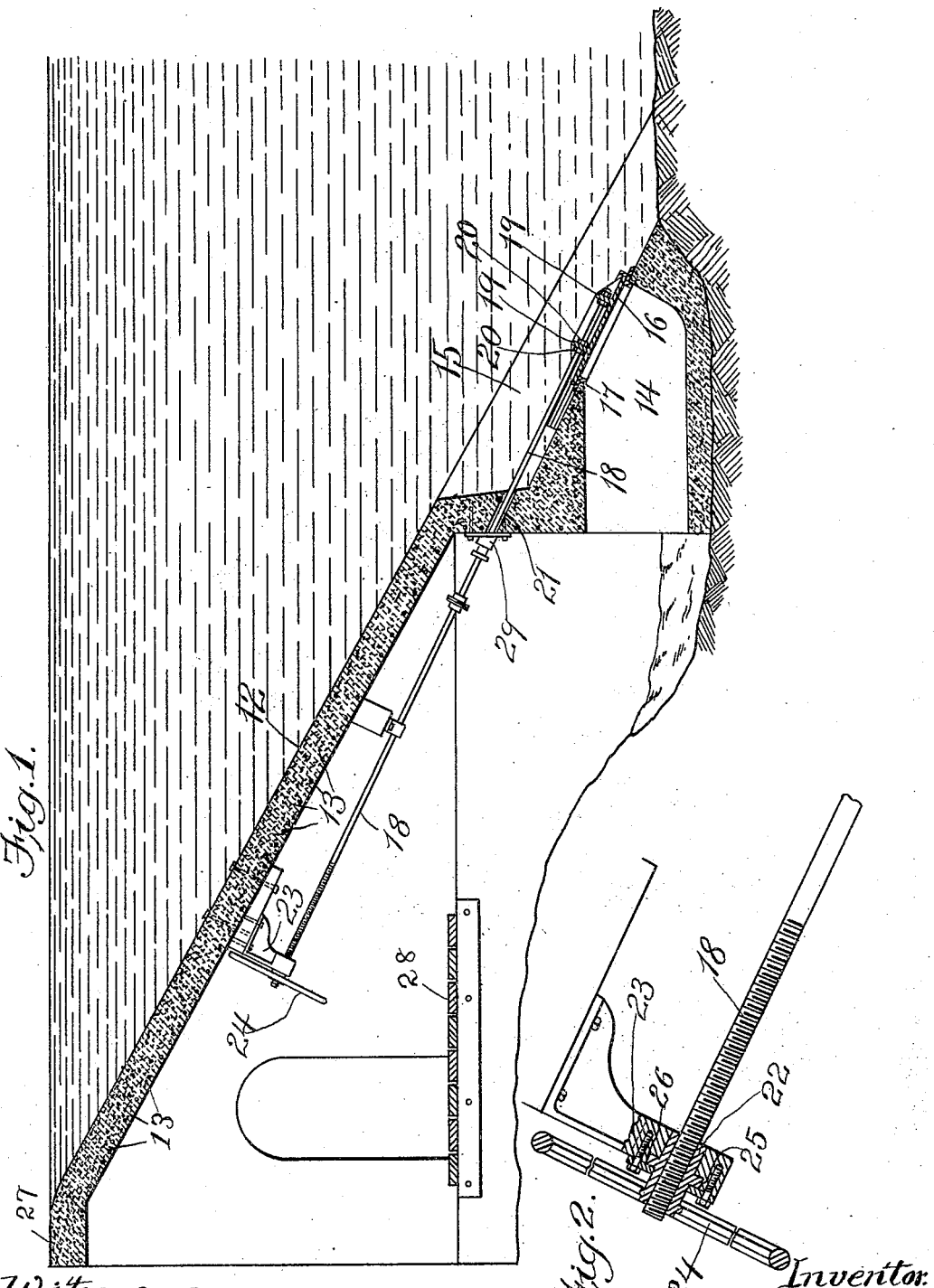

UNITED STATES PATENT OFFICE.

NILS FREDRICK AMBURSEN, OF NEWTON, MASSACHUSETTS.

WASTE-GATE FOR DAMS.

No. 807,010.  Specification of Letters Patent.  Patented Dec. 12, 1905.

Application filed June 2, 1905. Serial No. 263,455.

*To all whom it may concern:*

Be it known that I, NILS FREDRICK AMBURSEN, of Newton, in the county of Middlesex and State of Massachusetts, have invented certain new and useful Improvements in Waste-Gates for Dams, of which the following is a specification.

This invention has for its object to enable waste-gates of dams to be operated from points below the crest or spillway of the dam, the operating mechanism being protected by the deck and spillway, so that the entire length of the dam may, if desired, be utilized as a spillway instead of being shortened, as is necessary when the gate-operating mechanism is located above the dam and requires an elevated wall or platform located at a higher level than the spillway for the accommodation of the gate-operating mechanism and the operators and, further, in order that the gate-operating mechanism may be free from the obstruction of ice.

The invention consists, chiefly, in a dam having a waste-outlet surrounded by a seat located at the upstream side of the dam, a gate held against said seat by the confined water, and gate-operating mechanism located beneath and protected by the crest or spillway of the dam, means being provided for supporting the operator below the spillway and above the discharge-stream in position to operate the gate while protected by the deck and spillway of the dam.

Of the accompanying drawings, forming a part of this specification, Figure 1 represents a transverse section of a dam embodying my invention. Fig. 2 represents a sectional view showing the gate-operating means.

The same reference characters indicate the same parts in both the figures.

In the drawings, 12 represents the deck of the dam, which is preferably of concrete, reinforced by longitudinal metal rods or bars 13, the deck being preferably inclined, as shown.

14 represents a waste-outlet which is formed in the lower portion of the deck. The portion of the deck in which the waste-opening is formed is preferably the bottom of a recess 15, formed at the lower or heel end of the deck, said bottom being offset from the main portion of the deck, so that its plane is below the plane of the under side or downstream surface of the deck.

16 represents a gate fitted to slide upon a seat 17, surrounding the waste-outlet, the seat being located at the upstream side of the dam, so that the gate is held against the seat by the confined water.

18 represents a rod engaged with the gate, preferably by being passed through ears 19 19 on the gate and confined against endwise movement by nuts 20, engaged with the rod and bearing on the opposite sides of the ears. The rod passes through an orifice 21, formed in the upper end wall of the recess 15, and is extended upwardly toward the crest of the dam and below the deck, as shown in Fig. 1. Suitable means are provided for moving the rod endwise in either direction, and thus opening or closing the gate. As shown in the drawings, said means comprise a screw-thread formed on the upper portion of the rod 18 and a nut 22, journaled in an arm or bracket 23, affixed to the deck, said nut being engaged with the screw-threaded portion of the rod and provided with a hand-wheel 24, by which it may be rotated to impart endwise movement to the rod and gate. The nut 22 is prevented from moving endwise in the bracket 23 by suitable means, such as a flange 25 on the nut working in a groove 26 in the bracket-arm. The said operating mechanism is located so far below and behind the crest or spillway 27 of the dam that an operator standing on a platform 28 above the discharge-stream and adjacent to the operating mechanism may actuate the latter, the operator and the operating mechanism being protected from the water by the deck and crest of the dam.

29 represents a stuffing-box secured to the front side of the wall through which the orifice 21 extends, said stuffing-box surrounding the rod and preventing the leakage of water around it.

With large gates double stems may be used, and the operating-gearing may be actuated by a power-shaft extending lengthwise of and underneath the deck of the dam. I therefore do not limit myself to the means for operating the gate here shown and described and may variously modify the same and substitute for the parts here shown suitable mechanical equivalents therefor without departing from the spirit of the invention.

I claim—

1. A dam having a waste-outlet, surrounded by a seat located at the upstream side of the dam, a gate held against said seat by the confined water, and gate-operating mechanism located underneath and protected by the crest and deck of the dam.

2. A dam having a waste-outlet in its deck, surrounded by a seat located at the upstream side of the dam, a gate held against said seat by the confined water, a rod movable with the gate and extending beneath the deck, and means located beneath the crest and deck of the dam for operating the rod and gate.

3. A dam having in its deck a waste-outlet surrounded by a seat located at the upstream side of the dam and an orifice extending through the deck adjacent to the outlet, a gate held against said seat by the confined water, a rod engaged with the gate and extending through said orifice, and means located beneath the crest and deck of the dam for operating the rod and gate.

4. A dam having a recess in the deck, a waste-outlet extending through the bottom of the recess, and an orifice in a wall of the recess, a gate for the outlet located in said recess, a rod engaged with the gate and extending through the orifice, and means located beneath the crest and deck of the dam for operating the rod and gate.

5. A dam having in its deck a waste-outlet and an orifice adjacent to the outlet, a rod engaged with the gate and extending through said orifice, said rod having a screw-threaded portion, and a nut engaged with the threaded portion and journaled in a fixed support beneath the crest and deck of the dam.

In testimony whereof I have affixed my signature in presence of two witnesses.

NILS FREDRICK AMBURSEN.

Witnesses:
  C. F. BROWN,
  E. BATCHELDER.